(No Model.)
A. J. BENNETT.
NUT LOCK.
No. 565,827. Patented Aug. 11, 1896.
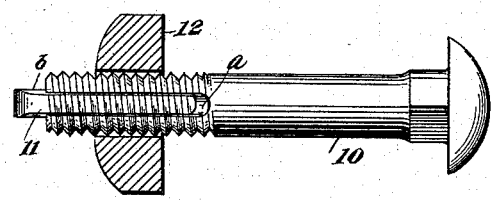
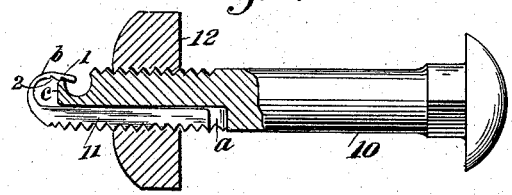
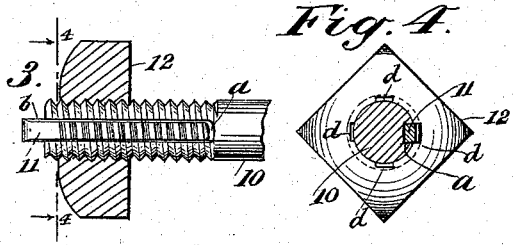
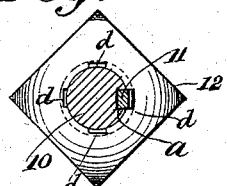
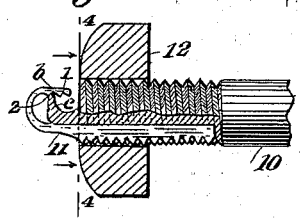
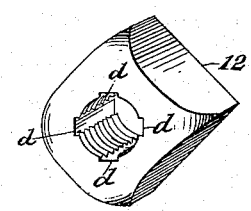
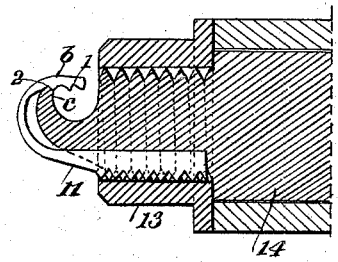
WITNESSES:
L. N. Legendre
Wm. P. Patton
INVENTOR
A. J. Bennett
BY
ATTORNEYS.

UNITED STATES PATENT OFFICE.

ANDREW J. BENNETT, OF BRIDGEWATER, IOWA, ASSIGNOR OF ONE-THIRD TO KEELEY R. MADDEN, OF SAME PLACE.

NUT-LOCK.

SPECIFICATION forming part of Letters Patent No. 565,827, dated August 11, 1896.

Application filed May 11, 1896. Serial No. 591,067. (No model.)

*To all whom it may concern:*

Be it known that I, ANDREW J. BENNETT, of Bridgewater, in the county of Adair and State of Iowa, have invented certain new and useful Improvements in Nut-Locks, of which the following is a full, clear, and exact description.

This invention relates to nut-locks of the securable-key type, and has for its object to provide a novel simple device of the indicated character which will be adapted for the releasable retention of a nut on a bolt, and that is also available for holding the nut of a vehicle-axle spindle from accidental displacement, the improved nut-lock being readily released and capable of reuse for an indefinite number of times.

The invention consists in the novel construction and combination of parts, as hereinafter described, and pointed out in the claims.

Reference is to be had to the accompanying drawings, forming a part of this specification, in which similar characters of reference indicate corresponding parts in all the figures.

Figure 1 is a side view of a bolt and a transverse sectional view of a nut thereon, the improved nut-lock being shown in position and adjusted to permit a rotation of the nut on the screw-bolt. Fig. 2 is a partly sectional side view of a bolt and transverse sectional view of a nut screwed thereon, the improved nut-locking device being represented in released adjustment. Fig. 3 is a side view of the threaded portion of a screw-bolt, a nut in section thereon, and the improved nut-lock adjusted to lock the nut. Fig. 4 is a transverse sectional view of the threaded bolt and nut locked thereon by the improved nut-locking device, the line of section being indicated at 4 4 in Figs. 3 and 5. Fig. 5 is a partly sectional side view of a threaded bolt-body, a nut in section thereon, and the improved nut-lock in locked adjustment. Fig. 6 is a perspective view of the nut for a bolt having features of the improvement; and Fig. 7 is a sectional side view of an axle-box and axle-spindle in part, having a sectional nut thereon, held in locked condition by the improved nut-lock.

To adapt the threaded body of a screw-bolt or the nut-receiving end of an axle-spindle for reception of the improved nut-lock, the end of said threaded bolt or spindle is longitudinally grooved of a suitable width and depth, the sides of said groove being shaped to fit the same for the reception of the locking-key that constitutes the nut-lock.

In the drawings representing the application of the improvement to a bolt and nut, 10 indicates the bolt-body, having its threaded portion suitably grooved, as at $a$ in Fig. 4. The nut-lock proper consists of a key-bar 11, fitted to slide in the groove $a$ and retained in place by the embedment of its body, as shown by cross-section in Fig. 4.

The key-bar 11 is threaded on the outer edges, which threaded surface forms a continuation of the threads on the bolt-body 10 when correctly adjusted to produce such an alinement of threads, as will be further explained. On the outer end of the key-bar 11 a spring-limb $b$ is formed, which is curved to project its free end toward the opposite end of said key-bar, said returned spring member being disposed nearly parallel with the body of the bar, as is clearly shown in Figs. 2 and 5.

The side of the spring-limb $b$ that is nearest to the main portion of the key-bar has two notches 1 2 produced in it for engagement with the toe $c$ that projects from the end of the bolt 10 toward the spring-limb.

The nut 12 may be of any peripheral form, its aperture being threaded to adapt said nut for a correct threaded engagement with the threads on the bolt-body 10. Such a relative position is given to the notches 1 and 2 in the spring-limb $b$ that when the toe $c$ of the bolt 10 is engaged with notch 1 the key-bar 11 will have its threads alined with those on the bolt-body, so that the nut 12 may be freely rotated thereon, as represented in Figs. 1 and 2. In the nut 12 one or more grooves $d$ are cut; preferably there are four of said grooves provided, which are suitably spaced apart.

The width and depth of the grooves $d$ which are produced in the nut 12 are sufficient to allow the key-bar 11 to be longitudinally moved, when the nut is adjusted so as to locate either of the grooves opposite the key-bar.

The notch 2 in the spring-limb $b$ is so spaced from the notch 1 that if the key-bar has its spring-limb $b$ released from the latter-named notch, and is slid sufficiently within one of the grooves $d$ of the nut to permit the toe $c$ of the bolt 10 to enter the notch 2, the threads on the key-bar will be moved out of alinement with the threads of the bolt and the nut 12 locked fast to the bolt, releasable only when the threads on the key-bar are again alined with those on the bolt-body.

In Fig. 7 the improvement is shown as applied for securing the nut 13 on the threaded end of the axle-spindle 14. In this application of the nut-lock the construction of key-bar 11 is similar with that already described. In a like manner the spring-limb $b$ thereon has the two-spaced notches 1 2 provided, which may be separately engaged with the toe $c$ that in this case is formed on the outer end of the spindle 14. It will be evident that when the toe $c$ on the spindle is located in the notch 2 this will so relatively dispose the key-bar 11 as to place the threads thereon between the threads on the spindle, which will securely lock the nut 13 on the spindle, a release of the latter being readily effected if the key-bar is adjusted so as to locate the toe $c$ in the notch 1 of the spring-limb $b$ on said key-bar.

It is evident that the improved nut-lock is capable of application to any bolt and nut which may be grooved, and will be perfectly reliable in service, permitting a quick release of the nut without injury to the improved nut-locking device, so that a reuse of the nut-lock for a number of times is feasible, which in many cases is very essential.

Having thus described my invention, I claim as new and desire to secure by Letters Patent—

1. The combination with a longitudinally grooved and threaded body, and a nut having a groove in its threads, of a threaded key-bar slidable in the groove of the threaded body when the groove in the nut is over said key-bar, and a spring-limb on the outer end of the key-bar adapted to lock said key-bar from sliding, substantially as described.

2. The combination with a longitudinally grooved and threaded body, and a nut transversely grooved in its threads, of a key-bar having one face threaded, and slidable in the grooves of the body and nut, said key-bar having a notched spring-limb adapted to engage with a toe on the threaded body, substantially as described.

3. The combination with a threaded body provided with a longitudinal groove, and a nut having a plurality of grooves in its internal thread, of a key-bar fitted to slide in the longitudinal groove of the body and threaded to correspond with the threads on said body, the key-bar having a return bent spring-limb at one end, said limb having spaced notches adapted to be separately engaged with a toe projecting from an adjacent end of the threaded body, substantially as described.

ANDREW J. BENNETT.

Witnesses:
J. A. HORTAN,
S. J. McFARLAND.